April 6, 1965
G. A. SCHMIDT
3,177,002
FAIL-SAFE MEANS FOR MECHANISM COUPLING
RUNNING GEAR TO VEHICLE BODY
Filed March 11, 1963
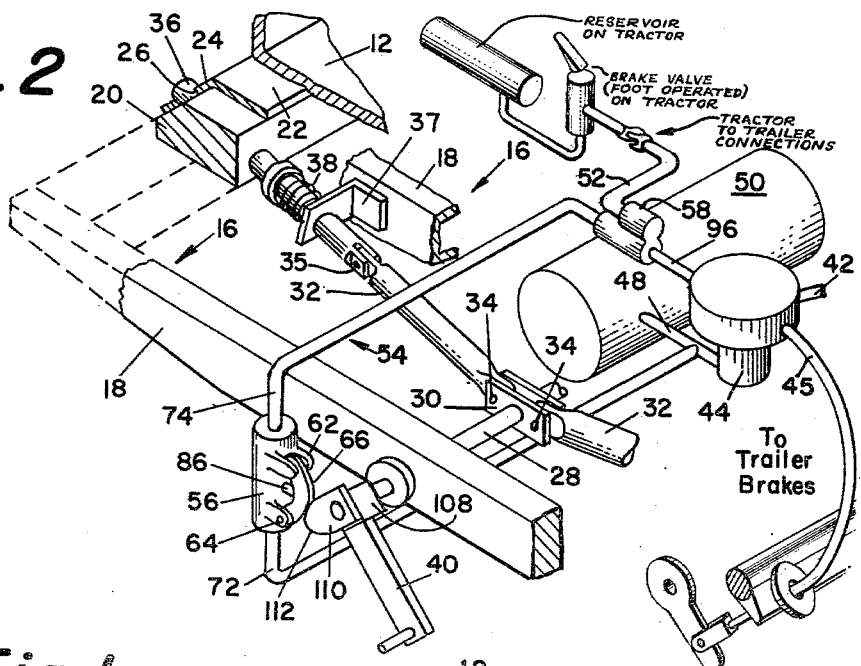
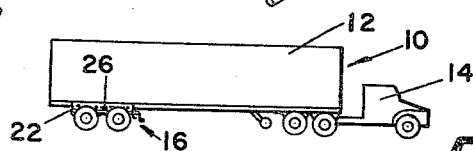
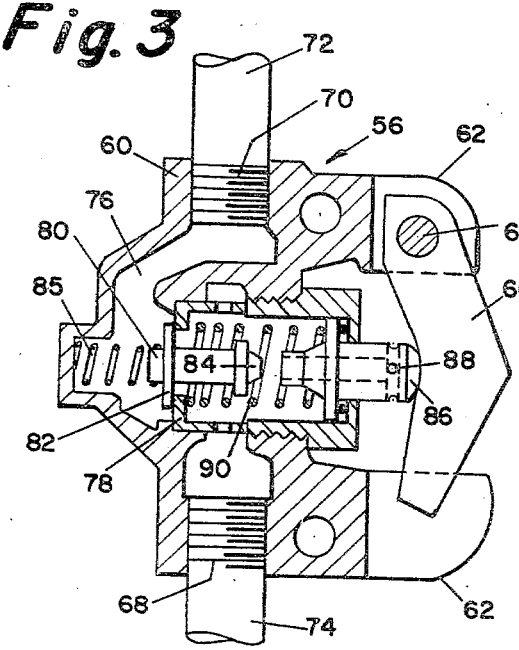
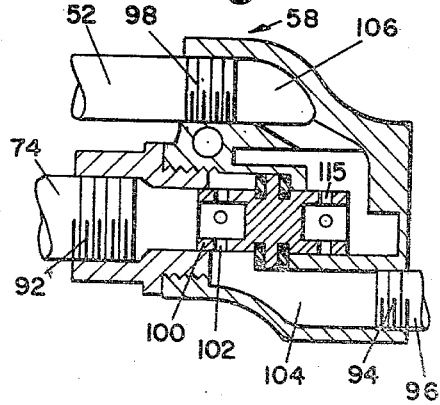
INVENTOR.
GEORGE A. SCHMIDT
BY
Millman and Jacobs
ATTORNEYS

United States Patent Office 3,177,002
Patented Apr. 6, 1965

3,177,002
FAIL-SAFE MEANS FOR MECHANISM COUPLING RUNNING GEAR TO VEHICLE BODY
George A. Schmidt, Langhorne, Pa., assignor to Strick Trailers, a division of Fruehauf Trailer Co., Philadelphia, Pa., a corporation of Michigan
Filed Mar. 11, 1963, Ser. No. 264,119
4 Claims. (Cl. 280—81)

This invention relates to an over-the-road vehicle, such as a trailer, wherein the running gear, wheeled unit or bogie as it is known in the trade is so coupled to the body that it can be adjustably shifted relative to the body to vary the load on the axle as desired, or removed entirely as in containerized cargo activity whereby the body laden or unladen can be transferred as such to a loading platform, railway car, ship, etc. One such construction is illustrated in U.S. Patent No. 2,841,411.

Heretofore, it was possible for the operator to ride off with the trailer believing that he had effected complete coupling of the bogie to the body when in fact he had not with the result that at a later time, particularly after stopping and restarting, the bogie would become entirely disengaged from the body leaving the rear thereof without support. It is the primary object of this invention to provide a fail-safe means which will prevent this from occurring.

Another object of the invention is to provide a fail-safe means of the character described which acts to apply the vehicle or trailer brakes when the bogie is uncoupled therefrom, which brakes are released only when the coupling of the bogie to the body is complete, and not before.

Another object of the invention is to provide a fail-safe coupling pin-brake interlock mechanism which requires no alteration of the coupling mechanism or brake system already in use but simply the addition of a line to the brake system with valves interposed therein and a cam associated with the coupling mechanism which is operative upon one of the valves when the coupling mechanism is actuated. Thus the invention is relatively simple to assemble on the vehicle and to operate.

These and other objects of the invention will become more apparent as the following description proceeds in conjunction with the accompanying drawings, wherein:

FIG. 1 is a diagrammatic side elevation of a trailer body embodying the invention;

FIG. 2 is a fragmentary perspective view of the invention with parts broken away to disclose details;

FIG. 3 is a sectional view through one of the valves employed in the invention shown inverted with respect to FIG. 2; and FIG. 4 is a sectional view through another of the valves employed in the invention.

Specific reference is now made to the drawings wherein similar reference characters are used for corresponding elements throughout.

Indicated at 10 is an over-the-road vehicle, such as a trailer, having a body 12 which is drawn by a tractor 14. This type of trailer has a wheeled unit or bogie 16 upon which the rear of the body is removably coupled so that the body may be slid off the bogie onto a railcar or platform or raised therefrom for transfer to ships, as in containerized freight haulage; or the bogie may be slid from one trailer body to another as in the system described in the Bohlen et al. Patent No. 3,004,772, or the bogie may be slid and recoupled to different positions on the same trailer body to adjust the load on the bogie axle as described in the Sheppard et al. Patent No. 2,841,411.

The removable coupling of the bogie to the body is effected by a mechanism such, for example, as that described in the aforesaid Sheppard et al. Patent No. 2,841,-411. The bogie includes a frame or chassis, upon which the wheels, axle and springs are mounted, which is constructed of interconnected transverse and longitudinal beams 18 and 20, the latter being preferably hollow. The trailer body has secured along its sides at the bottom thereof longitudinal, preferably angulated, rails 22 which slidably engage the longitudinal bogie beams 20, the vertically extending flange 24 of which is preferably provided with spaced apertures 26.

The coupling unit is comprised essentially of a longitudinal shaft 28 which is rotatably mounted on the transverse bogie beams 18, spaced plates 30 secured upon the shaft and elongated connecting rods 32 which are pivoted at their inner ends as at 34 between the plates. Each rod is pivoted at its outer end as at 35 to a coupling pin 36 which extends preferably upwardly and outwardly towards the sides of the bogie and slidably through a bracket 37 carried by a transverse beam 18, the outer end of the pin passing through a pair of angularly aligned apertures in the longitudinal beam 20, there being a spring 38 between said bracket 37 and a stop on the coupling pin which is biased to urge the outer end of the pin through the aperture 26 of the trailer side rail 22 in the coupling position. A handle 40 is provided at the end of the shaft 28 which when rotated 90° clockwise causes the outer ends of the coupling pins to retract from the side rail apertures 26 against action of the springs 38, at which time the bogie may be shifted relative to the body, there being a releasable latch (not shown) to retain the coupling pins or rods in the uncoupled position. For security, each bogie frame is preferably provided with two sets of coupling rods operatively connected to the shaft 28 and coupling is effected by releasing to latch manually or by an indexing means, and rotating the handle 90° counter clockwise.

Without more, it is possible at times for the outer ends of the coupling pins to extend incompletely through the aperture 26 of the trailer body side rails and these can then be jarred into fully retracted positions without the operator's knowledge causing unwanted disengagement of the bogie from the body. The fail-safe mechanism of the instant invention prevents this.

In the conventional trailer body system, air is furnished from a reservoir on the tractor 14 through an emergency line 42 to a relay emergency valve 44 and from there as at 45 to the brake chamber and an air reservoir 50. The relay emergency valve is appropriately mounted on the bogie frame and is connected by conduit 48 to the air reservoir 50 which is also mounted on the bogie frame. In normal service when the driver depresses the foot pedal, air is admitted to the service line 52 which enters the relay emergency valve 44 which, in turn, releases air from the bogie reservoir 50 to the brake chambers on the bogie, balancing the brake chamber pressure in proportion to the service line pressure. When the pressure in the emergency line drops below a predetermined value, such as 45 p.s.i., air will automatically be released from the bogie reservoir 50 to the brake chambers.

In the instant invention, the aforementioned conventional air brake system is employed but a means is provided to isolate the service application by foot pedal at the tractor and at the same time to apply the brakes on the bogie when the coupling pins 36 are uncoupled, the brakes being released and service application by foot pedal being restored only when the coupling pins extend completely through the trailer side rail apertures 26. To accomplish this a conduit or line 54 is provided which is connected at one of its ends to the line 48 from the reservoir 50 and at its other end to the service line 52 leading to the relay emergency valve. Interposed in this line 54 is lever-operated three-way valve 56 which is actuated by rotation of the handle 40 and a two-way check valve 58 which selectively closes off or permits the opening of the service line 52 in response to the opening and closing of the valve 56.

Any three-way lever actuated valve can be employed. Illustrative of such a valve is the unit shown in FIG. 3 which is commercially available as normally closed three-way valve No. 3417 made by A. Schrader's Son of Brooklyn, New York. It comprises a valve body 60 with lateral ears 62 upon one of which is pivoted as at 64 an angulated lever 66. The body includes ports 68 and 70 which threadedly receive the branches 74 and 72 respectively of the line 54. Interposed in the passage 76 connecting the ports 68 and 70 is a seat 78. An auxiliary stem 80 includes a poppet valve 82 intermediate its ends and an auxiliary seat 84 at its upper end. The spring 85 urges the poppet valve 82 against the seat 78 thereby closing off the passage 76. Beyond the seat 78 is a hollow stem 86 having one or more exhaust ports 88. A spring 90 urges the stem outwardly towards the lever 66 at which time the auxiliary seat 84 is uncovered so that air passes from the branch 74 through the stem 86 and out the exhaust port 88. When the lever 66 is fully depressed, the auxiliary seat 84 is closed, the poppet valve 82 is unseated whereupon air flows from branch 72 through passage 76 and through branch 74 to the two-way check valve 58.

Any two-way check valve may be employed. Illustrative of such a valve is the unit shown in FIG. 4 which is commercially available as two-way check valve No. 5200 made by Homer T. Seale, Inc. of Los Angeles, California. It comprises a valve body having laterally opposed ports 92 and 94, the former threadedly engaging the conduit branch 74 and the latter threadedly engaging a short conduit section 96 leading to the relay valve 44. The valve body also includes a branch section with a port 98 which threadedly engages the service line 52. A shuttle 100 is slidably mounted in the body having holes 102. When air passes through branch conduit 74 into port 92 it moves the shuttle to a position where the air can pass through the holes 102, the passage 104 and out through port 94. In so doing the passage 106 between port 98 and port 94 is closed off. When no air passes through port 92, the shuttle is moved back when air is applied through conduit 52 to a position where the port 92 is closed off and the passage 106 opened via holes 115 to establish communication between port 98 and port 94.

The handle 40 is mounted on the shaft 28 by means of a block 108 which also mounts a cam plate 110 having a cam surface 112 of predetermined curvature that bears on the apex of the lever 66. In use, when the handle 40 is rotated 90° clockwise, the outer ends of the coupling pins 36 are retracted from the side rail apertures 26 into the bogie beams 20. As this operation commences, the valve stem 86 is depressed, the auxiliary valve seat 84 is closed and the poppet valve 82 is moved off its seat 78 so that air from the branch line 72 passes through passage 76, port 70 and branch line 74. This air then moves the shuttle 100 of two-way check valve 58 closing off port 98 to the service line 52 and establishing communication with line 96 and relay emergency valve 44 to thereby admit air in the brake chambers on the bogie and thus put on the trailer or bogie brakes while isolating the service line 52. Thus when uncoupled from the trailer body, the bogie is restrained and the trailer can be moved by the tractor relative to the bogie. When the handle is rotated back 90° in the counter clockwise direction to effect coupling, the cam surface moves from its high to its low point thereby permitting first the heavier spring 85 and then the lighter spring 90 to move the stem outwardly. The curvature of the cam surface is such that only when the outer ends of the coupling pins 32 are completely through the side rail apertures 26 is the hollow stem 88 in its fully extended position, at which point the passage 76 between the branches 72 and 74 is closed off and the stem is unseated from the auxiliary seat 84. Thus the air from branch line 74 bleeds out through the exhaust port 88 in the stem. This releases the trailer brakes and the operator is free to move the trailer and apply the foot brake pedal as needed. At the same time, the shuttle 100 is free to move to close off the now open branch line 74 in response to pressure in the service line 52 and open the passage 106 between the service line 52 and the line 96 to the relay emergency valve 44.

Minor variations in the construction and arrangement of ports may be made by skilled artisans without departing from the spirit of the invention and the scope of the appended claims.

I claim:

1. A vehicle comprising a body, a wheeled unit including pneumatic brakes, means to couple said wheeled unit and to uncouple the same from said body, a tractor connected to said body and including means to operate said brakes, a first conduit extending from said tractor to said wheeled unit and operatively connected between said brake operating means and said brakes, an air reservoir and means actuated by said coupling means to energize said brakes but isolate said brake operating means on said tractor when said wheeled unit is uncoupled from said body, and to release said brakes and restore said brake operating means on said tractor when said wheeled unit is fully coupled to said body, said last-named means including a second conduit from said reservoir to said first conduit and operatively connected to said brakes, a cam operatively connected to said coupling means and a valve interposed in said second conduit including a depressible valve stem engaged by said cam, said stem being completely depressed by said cam to open said second conduit as said wheeled unit is uncoupled from said body and said stem being extended to a position where the valve closes off said second conduit and allows air to bleed off from said brakes when said wheeled unit is fully coupled to said body, and a two-way check valve operatively connected between said first and second conduits, said two-way check valve acting to close off said first conduit when said valve stem is completely depressed, said two-way check valve being free to open said first conduit and allow connection to said brake operating means and to close off said second conduit when said valve stem is extended.

2. A vertical comprising a body, a wheeled unit including pneumatic brakes, means to couple said wheeled unit and to uncouple the same from said body, a tractor connected to said body and including means to operate said brakes, a first conduit extending from said tractor to said wheeled unit and operatively connected between said brake operating means and said brakes, an air reservoir and means actuated by said coupling means to energize said brakes but isolate said brake operating means on said tractor when said wheeled unit is uncoupled from said body, and to release said brakes and restore said brake operating means on said tractor when said wheeled unit is fully coupled to said body, said last-named means including a second conduit from said reservoir to said first conduit and operatively connected to said brakes, a valve interposed in said second conduit, a means operatively connected to said coupling means selectively actuating said valve to open said second conduit and close off connection between said first conduit and said brake operating means as said wheeled unit is uncoupled from said body and to close said second conduit and allow air to bleed off from said brakes and restore connection between said first conduit and said brake operating means when said wheeled unit is fully coupled to said body.

3. A vehicle comprising a wheeled unit including pneumatic brakes, a body slidably mounted thereon and including rails engaging portions of said unit, a shaft rotatably mounted on said wheeled unit including pins operatively connected thereto and extending slidably through said portions of said wheeled unit and said body rails whereby rotation of said shaft in one direction will retract said pins from said rails and uncouple said wheeled unit from said body and rotation of said shaft in an opposite direction will cause said pins to extend through said rails and couple said wheeled unit to said body, a tractor connected to said body and including means to operate said brakes, an air reservoir on said wheeled unit, a relay valve operatively connected between said reservoir and said brakes, a first conduit operatively connecting said brake operating means to said relay valve and extending from said tractor to said wheeled unit, and means causing application of said brakes and isolation of said brake operating means on said tractor when said shaft is rotated in said one direction to retract said coupling pins from said body rails and to release said brakes and restore said brake operating means on said tractor when said shaft is rotated in said opposite direction and said coupling pins extend completely through said body rails, said last-named means including a two-way check valve interposed in said first conduit, a second conduit connected between said reservoir and said two-way check valve and operatively connected to said relay valve, a three-way valve in said second conduit having a depressible valve stem, a cam on said shaft and means effecting engagement of said cam with said valve stem whereby when said shaft is rotated in said one direction to retract said coupling pins said valve stem is fully depressed by said cam to open said second conduit whereupon said two-way check valve closes off said first conduit but allows air to pass from said reservoir to said relay valve to actuate said brakes, and when said shaft is rotated in said opposite direction to extend said coupling pins through said body rails said valve stem is extended to close off said connection of said second conduit to said reservoir and allow air to bleed from the portion of said first conduit between said two-way check valve and said relay valve through said three-way valve before said two-way check valve is free to open communication between said first conduit and said brake operating means and closes off connection between said second conduit and said relay valve.

4. The combination of claim 3 wherein said means effecting engagement of said cam with said valve stem includes a lever pivoted to said three-way valve and a spring urging said valve stem against said lever and the latter into engagement with said cam.

References Cited by the Examiner
UNITED STATES PATENTS

| | | | |
|---|---|---|---|
| 1,766,780 | 6/30 | Finch | 280—428 X |
| 2,489,117 | 11/49 | Black | 280—428 X |
| 2,560,769 | 7/51 | Knudsen | 280—428 X |
| 2,606,739 | 8/52 | Gardner | 280—428 X |
| 2,676,675 | 4/54 | Rumbold | 303—8 |
| 2,841,411 | 7/58 | Sheppard et al. | 280—81 |
| 2,946,485 | 7/60 | Durner. | |
| 3,073,623 | 1/63 | Owen | 188—3 X |
| 3,085,833 | 4/63 | Schultz | 303—29 |
| 3,102,738 | 9/63 | Roshia | 280—81 X |

A. HARRY LEVY, *Primary Examiner.*

PHILLIP ARNOLD, *Examiner.*